Figure 7:
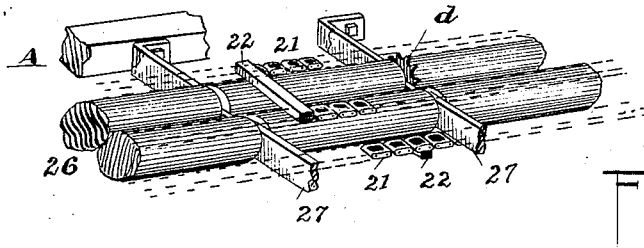

No. 773,664. PATENTED NOV. 1, 1904.
H. E. MOORE.
CORN HUSKING MACHINE.
APPLICATION FILED OCT. 5, 1903.
NO MODEL. 4 SHEETS—SHEET 1.
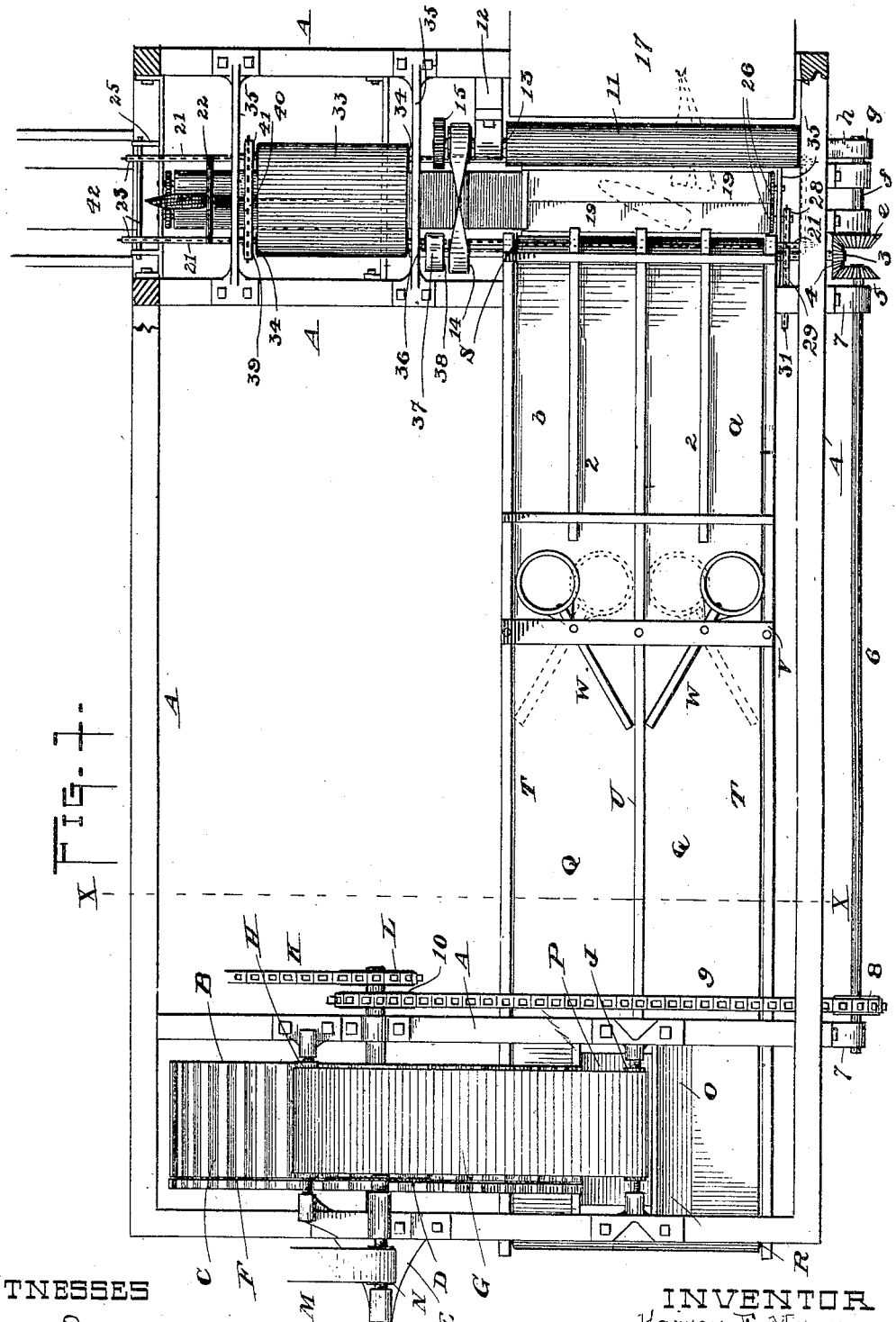
WITNESSES
Mac Davis
Beatrice Barlow
INVENTOR
Harvey E. Moore,
By L. N. Thurlow,
Atty.

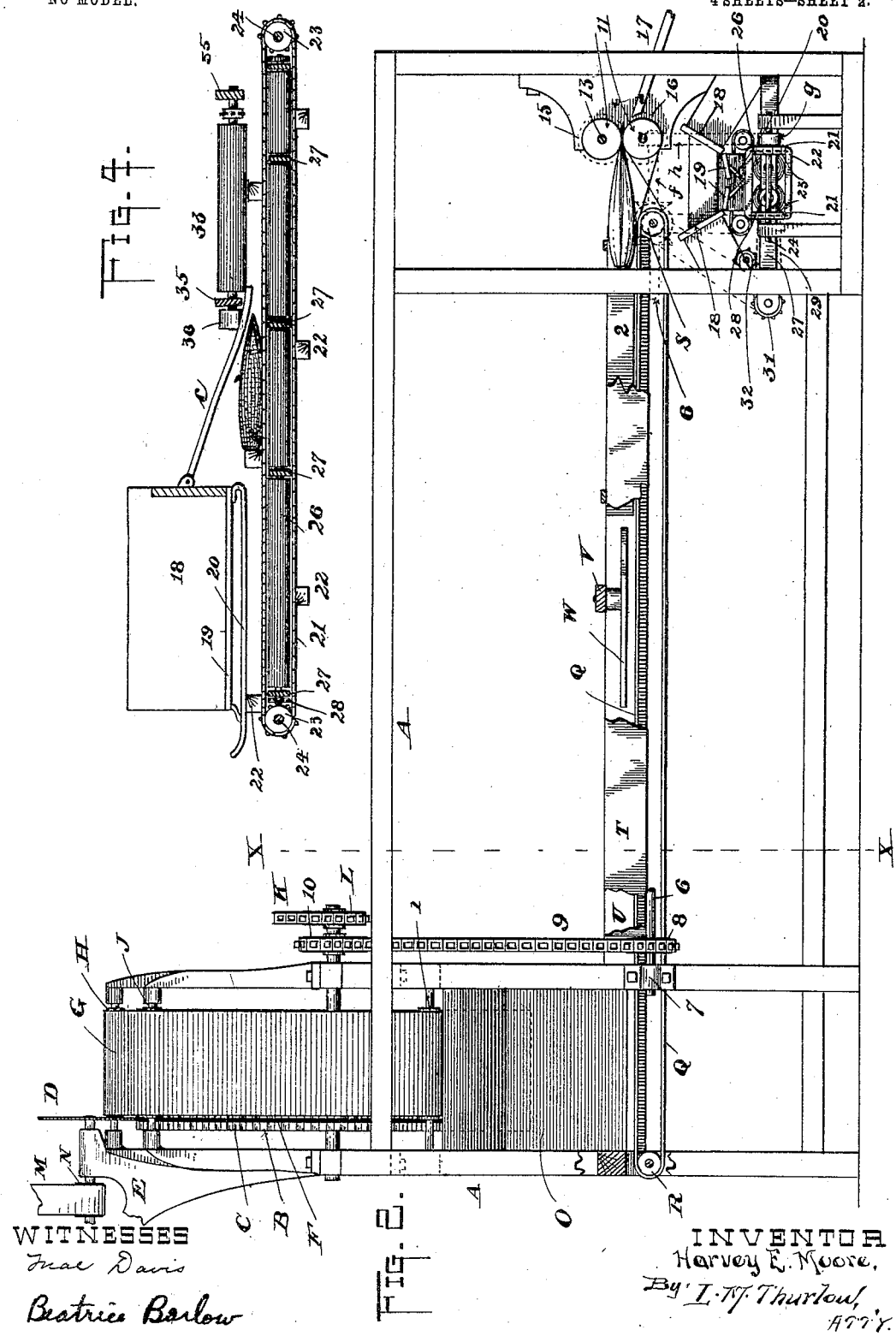

No. 773,664. PATENTED NOV. 1, 1904.
H. E. MOORE.
CORN HUSKING MACHINE.
APPLICATION FILED OCT. 5, 1903.
NO MODEL. 4 SHEETS—SHEET 3.
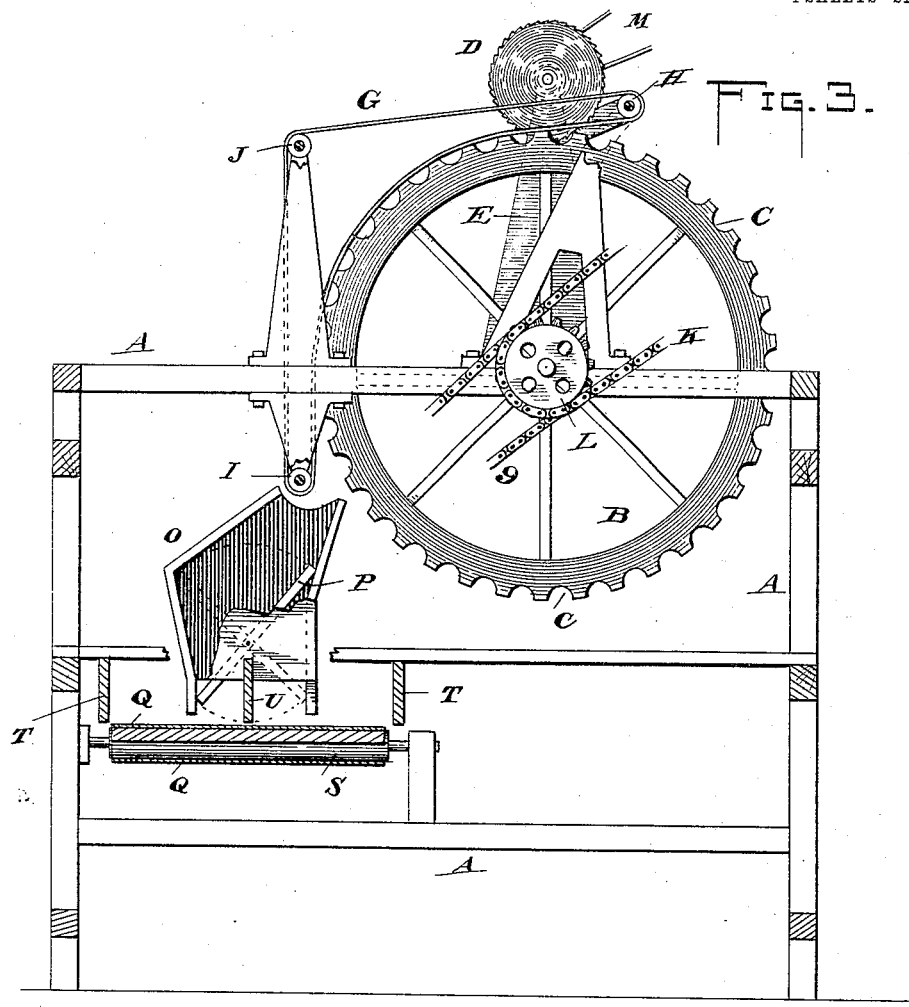
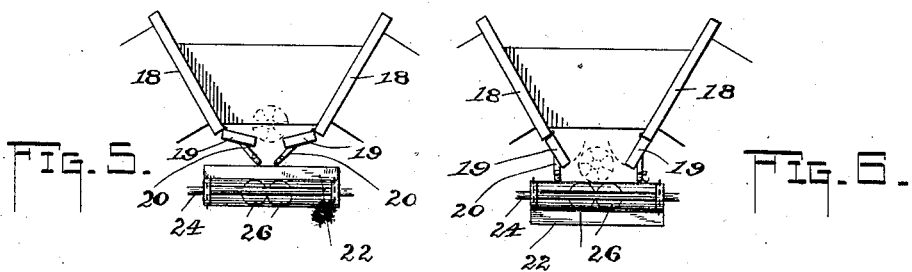
WITNESSES
mae Davis
Beatrice Barlow
INVENTOR
Harvey E. Moore,
By I. M. Thurlow
ATTY.

No. 773,664. PATENTED NOV. 1, 1904.
H. E. MOORE.
CORN HUSKING MACHINE.
APPLICATION FILED OCT. 5, 1903.
NO MODEL. 4 SHEETS—SHEET 4.

WITNESSES
mae Davis
Beatrice Barlow.

INVENTOR
Harvey E. Moore,
By L. M. Thurlow,
ATTY.

No. 773,664.

Patented November 1, 1904.

UNITED STATES PATENT OFFICE.

HARVEY E. MOORE, OF EUREKA, ILLINOIS.

CORN-HUSKING MACHINE.

SPECIFICATION forming part of Letters Patent No. 773,664, dated November 1, 1904.

Application filed October 5, 1903. Serial No. 175,725. (No model.)

*To all whom it may concern:*

Be it known that I, HARVEY E. MOORE, a citizen of the United States, residing at Eureka, in the county of Woodford and State of Illinois, have invented certain new and useful Improvements in Corn-Husking Machines; and I do hereby declare that the following is a full, clear, and exact description of the invention, which will enable others skilled in the art to which it appertains to make and use the same.

This invention pertains to a machine for husking corn, being more particularly adapted for husking green corn in canning factories, but can be employed also for husking ordinary field corn whether green or dry.

The object of my invention is to provide mechanism to which the ears of corn may be fed and which will eject the ear perfectly free from any husk particles or silk.

To my knowledge no machine has been heretofore produced to husk corn in the green state for use in canneries, and the method by which this work has been accomplished has been entirely by hand. Furthermore, it has been usual in husking corn in its dry state to snap off the stems. By this means the husk usually comes away with the stem, and the work is done as near correct as it is necessary for it to be. However, in husking green corn for canning purposes it is well known that the ear must be perfectly clean and free from all objectionable matter. It is therefore my intention to reverse the usual husking process in order to better accomplish the thorough cleaning of the ear, since it is at once evident that green corn cannot be husked in the same manner as dry corn. In treating the latter it is customary to feed the ears butt-end or stem end into rollers which pinch off the stem and husk and allow the freed ear to pass to the receptacle designed for receiving it; but in my machine the stem and butt ends of the husks are cleanly cut from the ear, after which the pointed or silk end of the ear is fed to the stripping-rollers, where the husks are drawn from it, all of which will appear in the specification following. I am aware, however, that there are several machines which do service in removing the butt from ears of dry corn and likewise the removal of the dried husks afterward; but in so far as I am apprised there are none used for husking green corn by drawing the husks over the point of the ear either in dry or green state. I am aware also that a saw has been employed in severing the butt-ends; but I attach no claim to this particular portion alone in the practice of husking green corn. The green corn could not be handled in the old way above mentioned, since it would not be parted from the stem without injury to the soft corn, and indeed it is doubtful whether such a method would be successful at all.

Figure 8:
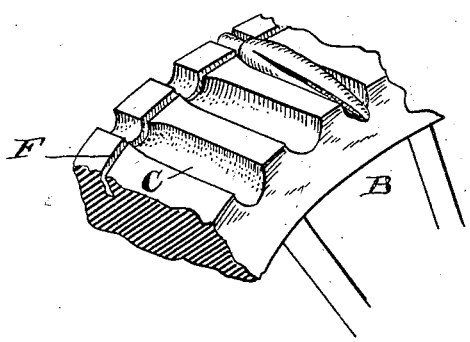
Figure 9:
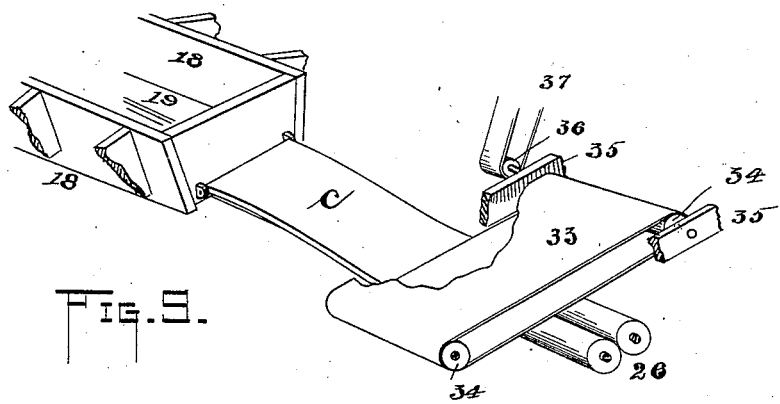
Figure 10:
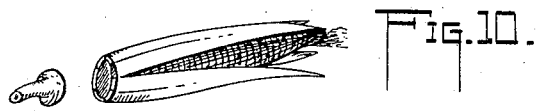

In the appended drawings, Figure 1 is a plan view of my improved corn-husking machine. Fig. 2 is a side elevation of the same with parts broken away to show construction and arrangement. Fig. 3 is an end view of the machine in section, being taken on line X X, Fig. 2. Fig. 4 is a side elevation of a hopper and certain cleaning-rolls to be described. Fig. 5 is a view in detail of a receiving-hopper and drag, the same being viewed from the end of the hopper. Fig. 6 is a similar view of the same portions, showing altered position of the bottom members of the hopper. Fig. 7 is a perspective view of two cleaning-rollers, showing a prick-wheel for assisting in removing husk portions. Fig. 8 is a perspective view of a portion of the periphery of a recessed wheel which receives and carries the ears to be husked. Fig. 9 is a perspective view of the hopper shown in Figs. 5 and 6, the rollers shown in Fig. 7, and also showing a transverse belt for said rollers. Fig. 10 is a perspective view of an ear of corn, showing the separation of the stem and butt-ends of the husks.

In the drawings, A indicates the framing of the machine, at one end of which is mounted a wheel B, having a series of recesses C in its periphery, as shown in Figs. 3 and 8. As shown in the latter figure, the said recesses C are shaped to receive the ears of corn. A saw-kerf extends entirely around the face of the wheel and divides the recesses into two sections. The ear is so placed in the resting-place therefor that its stem lies above the saw-cut, and when severed by the saw, to be described, it appears, as in Fig. 10, with the stem and the butt-end of the husk removed. A circular saw D is mounted in bearings in the top of the arm E, secured on the frame A, as shown, and lies within the cut or kerf F, which has been described, and it will be understood that a revolution of the wheel B will carry the kerf entirely around beneath the saw. It will further be seen that a fast revolution of the saw will serve to sever the stems of the ears, so that they will all be ready for further operations.

An endless belt G travels with the wheel B and covers about one-quarter of its periphery, as shown in Fig. 3. This belt is carried on three rollers, one of which is indicated by H and which lies forward of the saw. A second one, I, is positioned back of the wheel B and below its center, while the third one, J, is located between the two just described, but considerably above, so that the said belt in passing from H to I follows the periphery of the wheel and then passes up over roller J and thence to H in its endless movement, the latter roller serving to keep the two runs of the belt separated. The purpose of the said belt is to clamp the ears of corn into the recesses C while they are being cut by the saw and also to finally help in the delivery of the ears to a receptacle for further operations. The rollers above described are suitably carried in arms secured to the frame of the machine and will require no further mention.

Power is supplied to the wheel B through a chain K and sprocket-wheel L, while a belt M and pulley N serve to drive the saw D. Sufficient friction exists between the wheel and the belt G to carry the latter over its rollers.

A hopper O is located below and behind the wheel B, as in Fig. 3, and within this is pivoted a valve designed to swing alternately back and forth by the entrance of the ears of corn dropped thereupon by the wheel B.

Beneath the hopper and running the full length of the machine at right angles to the belt G is a canvas carrier Q, the same being carried by means of rollers R S, mounted in any good manner in bearings on the frame A. This carrier travels between side boards T, forming part of the machine-frame, while above the carrier, at the middle thereof, is a partition U, dividing the said carrier into two equal portions. A cross-piece V, resting on and secured to the sides T, supports the central partition U and also carries, by means of pivots, two switches W, while in line with each said pivots is a short partition 2, which, together with the central one, U, serve to divide the width of the carrier Q into four substantially equal divisions at the delivery end. The hopper O and its valve serve to place the ears in proper position for meeting the husking-rollers, to be described; but it is to be understood that other means may be employed for accomplishing the same result. The carrier Q and the switches W serve also in assisting to carry the ears in the proper manner to said rollers. The roller S, carrying the said delivery end of the carrier, is carried by a shaft 3, on which is a beveled gear 4, which receives motion from a similar gear 5, carried on a shaft 6, having bearings 7 at the side of the machine. A sprocket-wheel 8 on said shaft is driven by means of a sprocket-chain 9 from a wheel 10 on the shaft of the wheel B, as shown.

Opposite the delivery end of the carrier Q is a pair of rollers 11, adapted to run together, so that, as shown in Fig. 2, the pointed end of the husk of an ear will be drawn in between them. Suitable bearings, but one of which is shown at 12 in Figs. 1 and 2, serve to support the rollers in proper relation to one another. The shaft 13 of the upper roller carries a pulley by which said roller is driven in the proper direction from a pulley 14 on the shaft 3 of the roller S. A gear-wheel 15 on the roller last referred to meshes with a similar gear 16 on the lower roller, and by this means the said lower one is driven positively and in the proper direction. A chute 17 is provided adjacent to the rollers 11 and serves to carry away the husks; but this will be more fully brought out later.

Situated below and between the roller S and the rollers 11 is a hopper consisting of the inclined sides 18, supported in suitable manner. Hinged to the sides are bottom flaps 19, as shown, to the under sides of which are secured metal guides 20, by which the said bottom flaps are made to open and close, as will appear presently. Beneath the hopper is a carrier consisting of two sprocket-chains 21, which carry a series of cross-slats 22. Said chains are driven by means of sprocket-wheels 23, carried on shafts 24, mounted in bearings 25, as shown in Fig. 1. Said carrier is located at right angles to the carrier Q and runs parallel with the rollers 11 and serves to drag away the ears of corn as they leave the hopper last described. Within the carrier thus constructed is a pair of rollers 26, extending the entire length of the said carrier, as shown in Fig. 4, said rollers being carried by horizontal bars 27, extending from between the upper and lower runs of the sprocket-chains 21 and secured to the frame A in substantially the manner shown in Fig. 7. On account of the great length of the rollers they are grooved at intervals and supported by the bars 27. One of these rollers is driven by means of a sprocket-wheel 28 on its shaft, said wheel being turned by means of a sprocket-chain 29, running on a sprocket-wheel 30 on shaft 3, thence down over idler-wheels 31 and 32, the latter two being provided in order to carry the chain to the wheel 28 without interference from the carrier-chains 21.

The opposite ends of the rollers are provided with gear-wheels, which meshing together serve to impart motion to each other in opposite directions. Above and running across the rollers 26 is a belt 33, carried on rollers 34, having bearings in cross-bars 35, bolted to the frame A. One of these rollers is driven by means of a pulley 36 thereon and a belt 37 on a pulley 38 on the shaft 3. The opposite end of the said roller carries a sprocket-wheel 39, over which runs a chain 40 to a similar wheel 41 on the opposite roller. It will be seen that motion imparted to the first roller from the said shaft 3 will transmit positive motion to the opposite roller through the sprocket wheels and chain, and consequently cause the belt 33 to be driven.

The slats 22 on the chains 21 serve to carry the ears of corn along the rollers 26 and finally deposit them into a chute 42, which may lead to an elevator or other device by which the said ears are transported to the machine, which removes the corn from the cob for canning.

The ears being fed at the front of the wheel, or at the right as viewed in Fig. 3, are carried upward toward and beneath the saw. The ears lie within the recesses, as shown in Fig. 8, with the stem bridging the saw-cut. In passing under the saw all of the ears are cut through, as shown in Fig. 10, the stem and the butt-ends of the husk being separated from the ear without injuring the kernels or losing any of the milk. The belt G serves to firmly hold the ears in place while being cut and also keeps them within the recesses until they reach the vicinity of the hopper O. Here they leave the wheel and belt and drop into said hopper upon the valve P. When the said valve is in the position shown in Fig. 3, the ear in falling upon it rolls down to the carrier Q to the left of the central partition U. Said carrier in moving toward the right as viewed in Fig. 1 now carries the ear toward and through the switch W and as it reaches said switch is compelled to push against the head thereof, pushing said head aside and causing it to assume the position shown in broken lines, the ear passing onward through the passage a, reaching the rollers 11 point first. Returning to Fig. 3, it will be seen that as the ear just described passes through the valve P it throws said valve to the broken-line position, so that the ear following will then be dropped to the right of the partition U, and in reaching that point returns the switch to the initial position. The ear then moves forward to the switch, which in the position shown in Fig. 1 sends it through the channel b, at the same time throwing the switch to the dotted-line position. The following ears in meeting the switches return them to the first position from which they are shifted by the ears coming later, as will be understood. By this arrangement of the switches and the valve P the full width of the carrier Q is utilized, the object being to carry the ears first through one channel and then through another, so that the rollers 11 will not be crowded at any one place, but will have work to do throughout their entire length. The switches being pivoted as shown and described must pass every other ear to a particular channel, and in this way such ears cannot be fed in a bunch to the rollers and cause congestion. Now on reaching the rollers the point of the ear must of necessity reach and enter between them, since the carrier Q is at such an elevation that the point of the ear is in line with the rollers where they contact, as shown in Fig. 2. Since the stem and part of the husk is removed by the saw, it follows that the husk being thus released at its rear end can be easily drawn over the ear, so that when the point of the husk enters between the rollers said husk is immediately drawn off, the ear being prevented from entering by reason of its size and its ability to resist squeezing and being now liberated from its husk falls upon the hinged bottom of the hopper beneath. It is designed that when the ear falls into the hopper the bottom shall be closed, as shown in Figs. 1, 2, and 4. This results from the presence of a slat 22 beneath the guides 20 of the flaps 19. The slats are intended to be of such a distance apart that the guides may fall between them and drop the ear upon the rollers 26. Then after the ear is dropped the next slat in passing up and around the sprocket-wheel 23 contacts with the guides and raises them and the flaps. Then the next ear is received, and so on. The ear on reaching the rollers 26, which revolve toward one another, is now stripped of any stray portion of the husk or silk that may adhere to it and which has not been drawn off by the rollers 11. The constantly-moving slats 22 carry the ear along the rollers beneath the transversely-moving belt 33, and this belt causes the ear to revolve, so that there can be no possibility of any portion of the ear escaping contact of the rollers. The belt is designed to travel as close to the rollers as possible without interfering with the slats 22 passing beneath, so that as much pressure can be put upon the ear as possible to compel it to revolve.

To the end of the hopper is hung a flap c, the end of which extends beneath the belt and serves to guide the ears and the slats under it without catching. In one of the rollers 26, Fig. 7, is a prick-wheel d, which extends sufficiently above the periphery of the roller to contact with the ear of corn, but which does not interfere with the belt 33. If any thin husk portion adhere closely to the ear that the rollers alone cannot remove, the wheel will catch it and drag it loose, so that it will at once be caught by the rollers and pulled off.

In place of the saw for removing the stems of the ears a revolving knife may be employed, and, in fact, any other form of device may be used that will accomplish the desired end. Other changes of one kind or another may be made in the machine without sacrificing any portion of my invention.

The hopper O need not be used necessarily, since the ears may be dropped from the wheel B immediately upon the carrier Q; but some means for properly directing the ears to the husking-rollers must be provided, whether in one form or another.

I claim—

1. A husking-machine for green corn comprising a holding member for the unhusked ears, a saw for removing the butts of the ears and husks for liberating the latter, husking-rollers adapted to receive the ears point first for grasping the points of the liberated husks, the said rollers adapted to carry the husks through them to the exclusion of the ear, a carrier adapted for placing the ears at right angles to the husking-rollers and feeding the same to such rollers point first for the purposes described, and means for removing unremoved particles of husk and silk from the ears after passing beyond the husking-rollers.

2. A machine for husking green corn comprising a member for holding the ears of corn, a circular saw adjacent thereto for cutting off the butts of the ears and husks, primary husking-rollers to which the ears are fed point first for the purposes set forth, means for delivering the ears point first to the said husking-rollers, a second set of rollers beneath the husking-rollers for receiving the ears after being husked, said under rollers adapted to remove portions of silk and husk not removed by the primary husking-rollers substantially as set forth.

3. A machine for husking green corn comprising a carrier for receiving and holding the ears of corn, a saw for severing the butts of the ears and husks, husking-rollers for receiving the ears point first for grasping the points of the husks and drawing them endwise off the ear through the rollers, a carrier for conveying the ears from the first carrier to the rollers, means for arranging the ears at right angles to the said husking-rollers and guiding them thereto, and a series of rollers beneath the husking-rollers for receiving the ears and removing the unremoved silk and husk portions as set forth.

4. A corn-husking machine of the character described comprising a carrier for the unhusked corn, a saw for removing the butts of the ears and husks, husking-rollers for removing the husks over the points of the ears, a carrier for conveying the ears point end first to the husking-rollers, said rollers adapted to carry the husks therethrough leaving the ear, rollers beneath the husking-rollers for receiving the husked ears and removing the portions of husk and silk still adhering, and a transversely-moving carrier above the latter rollers and adapted to turn the ear upon said rollers holding the same thereon for the purposes set forth.

5. The combination of a frame, with a carrier for unhusked ears of corn mounted thereon, means for severing the stems from the cobs of the ears, husking-rollers, a conveyer extending from the carrier to a point near the husking-rolls, and means on the frame above the conveyer for placing the ears on the conveyer at right angles with the rolls.

6. The combination of a frame, with a carrier mounted thereon, means for severing the stem from the cobs of the ears, husking-rollers, a conveyer extending from the carrier to a point near the husking-rolls and means on the frame above the conveyer for receiving the ears and conducting them to the conveyer and for placing the ears on said conveyer at right angles to the husking-rollers, said conveyer carrying the ears so arranged to the rolls pointed end first for the purposes set forth.

7. The combination of a frame, with a carrier for unhusked ears mounted thereon, means for removing the stems from the cobs of the ears, husking-rollers for receiving and grasping the points of the husks of the ears, and removing such husks from the ears over the points thereof, a conveyer for receiving the unhusked ears after removal of the stems, said conveyer extending from the carrier to the husking-rolls, and means above the conveyer for receiving and arranging the ears on the conveyer at right angles to the husking-rolls.

8. In a corn-husking machine, a revoluble member having a series of recesses for receiving the ears of corn, a cutter adjacent thereto and engaging therewith substantially as set forth and adapted to sever the stems of the ears, a carrier adjacent to the revoluble member for holding the ears of corn in place in the said recesses, rollers for removing the husks over the ends of the ears as described, a carrier for conveying the ears from the revoluble member, after being released, to the said rollers, a distributing-hopper between the said revoluble member and the said carrier for receiving the ears from the former and delivering them to the latter, a hopper beneath the husking-rollers for catching the ears from the said rollers, rollers beneath the hopper for receiving the ears for cleaning them of any portions not already removed, and means for revolving the ears upon the latter rollers to insure such cleaning.

9. In a corn-husking machine the combination of an endless recessed member for receiving and retaining the ears of corn, a cutter stationed adjacent to such member for severing the stems of the ears of corn carried thereto by said member, means for holding the ears upon said member and assisting in delivering the same, a hopper beneath the member into which the ears are delivered, a carrier beneath the hopper for carrying away the ears after being cut, rollers to which the ears are fed point first by said carrier, said rollers adapted for stripping the husk from the ear over the pointed end thereof, a hopper for receiving the husked corn, rollers beneath the hopper for cleaning the ear of remaining husk portions, a carrier for pushing the ears along said rollers, and a transverse belt above the rollers for assisting in revolving the ear for the purposes described.

10. In a corn-husking machine a revoluble member having a series of recesses in its periphery for receiving and retaining ears of corn, a rotary cutter having bearings adjacent to said member said cutter rotating in close proximity to the member and adapted for severing the stems of the ears of corn, a belt adjacent to and moving with and against the member for holding the corn in place while being severed, a hopper beneath the belt and revoluble member for receiving the cut ears, a valve within the hopper for distributing the ears for the purposes indicated, a carrier for conveying the ears away from the hopper and valve, rollers for receiving the pointed ends of the husks of the ears from the said carrier, said rollers adapted to draw the husks from the ears over the pointed ends thereof, a receiving-hopper beneath the rollers for the reception of the husked ears, rollers beneath the hopper upon which the ears are carried along for cleaning off the silk and husk portions not already removed by the primary rollers, and means for pushing the ears along the cleaning or secondary rollers for the purposes indicated.

11. In a corn-husking machine a revoluble member having a series of recesses in its periphery for the reception of ears of unhusked green corn, a rotary cutter adjacent to said member, a recess in the periphery of the revoluble member and extending entirely around it crosswise of the said recesses for holding the corn, said cutter revolving within such peripheral recess for the purposes described, means for retaining the ears in their recesses while being cut, a distributing-hopper beneath the revoluble member that contains the corn, a carrier beneath such hopper for receiving the corn therefrom, rollers at the delivery end of the carrier for receiving the ears point first from that member substantially as set forth and for the purposes described, a hopper beneath the rollers for receiving the corn from such rollers after being relieved of the husks, and secondary rollers beneath the hopper for receiving and cleaning the ears of adhering matter.

12. In a corn-husking machine a revoluble member having a series of recesses in its periphery substantially parallel with the axis of said member, a rotary cutter adjacent to said member, a recess extending around the periphery of the member and dividing the first said recesses into two portions for the purposes described, said cutter adapted to revolve within such peripheral recess, a belt adjacent to and traveling with the revoluble member for the purposes indicated, a distributing-hopper beneath the member for receiving ears of corn therefrom, a carrier beneath the hopper, a pair of husk-stripping rollers for receiving the ears of corn point first from the said carrier, a pair of rollers beneath the first for receiving the ears and means in conjunction with the said secondary rollers for removing adhering silk or husk portions from the ear.

13. In a corn-husking machine the revoluble member B having a series of parallel recesses C in its periphery substantially parallel with the axis of the member, there being a peripheral groove in the said member at right angles to the recesses C and dividing the latter into two portions, a cutter D adjacent to the member and seated in said peripheral groove to sever ears of corn lying in the recesses C, belt G for holding ears in place while being severed, the hopper O beneath the member B for catching the ears, the valve P therein for distributing the ears as set forth, the carrier Q beneath the hopper, the rollers 11 for receiving the ears point first for removing the husks over the point of the ear, the said ears being fed thereto by means of the said carrier, rollers 26 beneath the rollers 11 for receiving the husked ears, the prick-wheel $d$ thereon for catching the tightly-adhering husk portions, and the transverse belt 33 running over the rollers 26 for causing the ears to turn upon the rollers all for the purposes set forth.

In testimony whereof I affix my signature in presence of witnesses.

HARVEY E. MOORE.

Witnesses:
E. J. ABERSOL,
L. M. THURLOW.